(12) United States Patent
Spaner

(10) Patent No.: US 7,729,812 B2
(45) Date of Patent: Jun. 1, 2010

(54) FIELD DEPLOYABLE POWER DISTRIBUTION SYSTEM AND METHOD THEREOF

(75) Inventor: Michael Aaron Spaner, Deep River, CT (US)

(73) Assignee: Proton Energy Systems, Inc., Wallingford, CT (US)

( * ) Notice: Subject to any disclaimer, the term of this patent is extended or adjusted under 35 U.S.C. 154(b) by 533 days.

(21) Appl. No.: 11/697,918

(22) Filed: Apr. 9, 2007

(65) Prior Publication Data

US 2007/0243425 A1 Oct. 18, 2007

(51) Int. Cl.
*G05D 9/00* (2006.01)
*G05D 13/02* (2006.01)

(52) U.S. Cl. .................................. 700/295; 700/28

(58) Field of Classification Search ............. 700/28, 700/286, 291, 295; 320/118; 718/32
See application file for complete search history.

(56) References Cited

U.S. PATENT DOCUMENTS

| | | | |
|---|---|---|---|
| 6,638,652 B1 * | 10/2003 | Motozono et al. ............ | 429/19 |
| 6,887,601 B2 | 5/2005 | Moulthrop, Jr. et al. ....... | 429/17 |
| 7,060,379 B2 | 6/2006 | Speranza et al. ............... | 429/9 |
| 7,083,875 B2 | 8/2006 | Lillis et al. ..................... | 429/21 |
| 7,192,667 B2 * | 3/2007 | Yang et al. ..................... | 429/25 |
| 7,241,522 B2 | 7/2007 | Moulthrop, Jr. et al. ....... | 429/17 |
| 7,244,524 B2 | 7/2007 | McCluskey et al. ............ | 429/9 |
| 7,353,083 B2 * | 4/2008 | Hennessy ................... | 700/286 |
| 7,485,383 B2 * | 2/2009 | Aoyagi et al. ................. | 429/24 |
| 7,632,583 B2 * | 12/2009 | Pearson ....................... | 429/22 |
| 2004/0160216 A1 | 8/2004 | Speranza et al. ............ | 320/140 |

* cited by examiner

*Primary Examiner*—Albert W Paladini
(74) *Attorney, Agent, or Firm*—Cantor Colburn LLP

(57) ABSTRACT

A system for providing field deployable electrical power distribution is provided. The system includes a plurality of power sources providing electrical power to meet the electrical needs of a field operations camp. The power sources include at least one regenerative fuel cell that is arranged to provide a electrical power when renewable energy sources are unavailable. Also provided is at least one generator and one regenerative fuel cell electrically connected to the plurality of loads. Also provided is a plurality of power converters, each of the plurality of power converters being electrically connected between the at least one generator and regenerative fuel cell and one of the plurality of loads. An arrangement is also included for providing a high availability battery charging station.

20 Claims, 4 Drawing Sheets

FIELD DEPLOYABLE POWER DISTRIBUTION SYSTEM AND METHOD THEREOF

FIELD OF INVENTION

This disclosure relates generally to a system for providing a power system incorporating multiple power sources for use in field deployable operations, and especially relates to systems incorporating renewable power sources as a source for recharging batteries.

BACKGROUND OF THE INVENTION

With the collapse of the Soviet Union, the government officials who operated the former communist state allowed the global proliferation of modern military equipment by selling off equipment through alternative channels of commerce. Through these black-market channels, even insignificant warlord chieftains and terrorists were granted access to weaponry that can disrupt the operations of some of the world's most sophisticated armies. In October 1993 U.S. Army Rangers raided a compound in Mogadishu, Somalia. The U.S. was responding to seizures of humanitarian supplies by local militia who were seeking to exploit the charity of the international community for their own pecuniary gain. During the raid, the militia's forces fired a surface-to-air missile, downing a U.S. Blackhawk helicopter. As a result, U.S. Army commanders redirected foot soldiers and mechanized forces to aid the injured pilots.

During the midst of a firefight and with enemy forces closing in on the helicopter's debris, commanders needed to rely on paper maps and surveillance video to generate routes to the injured pilots. The commanders radioed turn-by-turn directions to the soldiers only to discover that many roads along the routes were impassable due to enemy obstructions. In the ensuing battle-lasting fewer than 24 hours—the U.S. lost two more Blackhawk helicopters and suffered 18 casualties.

To avoid such situations in the subsequent missions, military planners took advantage of advancements in technology to provide soldiers, and their commanders access to an unprecedented amount of information. Some of the information is now collected in real-time using computers, sensors and communications equipment carried by each soldier in the field.

This so-called "integrated soldier technology" created a system that meshes each soldier into the digitized battlefield as a "weapons system" in his own right, each man-platform contributing to the larger, network enabled environment where each soldier platform becomes a key component within the network centric battlefield system. Enhanced communications capability including voice, data, images and internet facilities is now available to each member on the battlefield. The system provides adequate bandwidth for the transfer of large volumes of tactical information. This technology combined with softer camouflage textiles will provide durability, environmental protection and reduced thermal signature.

In addition to its role as protective gear, the modern soldier's helmet has a computerized display that enables the user to view the weapon's mounted sight as well as computer generated images. Together with alternative displays such as weapon mounted sights and hand held computers these elements provide remote viewing of mission critical data including maps, images and video from stored or real-time sources. These remote sources could include weapons sights from other section members, ground sensor pictures sent directly from unattended sensors or from their commanders, or surveillance cameras mounted on unmanned aerial or ground vehicles. GPS systems are combined with navigation subsystems, to provide fully integrated navigation, orientation and target acquisition capability. The soldier can plan a route in advance, incorporating waypoints and avoiding dangers, using helmet mounted display with visual or audible cues.

Through the use of advanced communications equipment carried by the individual soldiers, additional benefits are also gained. A common problem encountered by modern armed forces during the confusion of battle, as evidenced during the Gulf War, is the phenomenon known as "friendly fire" in which forces accidentally fire on their own troops causing unnecessary casualties and fatalities. Instances of friendly fire often involve aircraft or helicopters accidentally firing on their own ground troops. By combining the communications capabilities with the GPS systems, commanders, pilots and individuals can avoid mistaking their fellow troops as the enemy.

Using this advanced technology, the military planners hope to avoid or stop situations such as that which occurred Mogadishu. However, the additional capabilities come at a price. The equipment and supplies carried by the average soldier, currently weigh nearly 80 lbs. For an average three day mission requires that the soldier carry 20 lbs to 30 lbs of batteries. This added weight has a detrimental effect on the mobility of soldiers.

While existing power systems are suitable for their intended purposes, there still remains a need for improvements in providing a reliable, light weight and field deployable power systems to provide military field operations with the electrical power to complete their missions and allow access to recharging facilities that minimize the need to carry large amounts of batteries. In particular, a need exists for a topology for a power system that provides a means for continuously providing power for recharging batteries when natural resources are unavailable.

SUMMARY OF THE INVENTION

A field deployable electrical power distribution system is provided having at least one electrical power source. The power source has a means for converting a natural renewable resource into electrical power. An electrical circuit is coupled to the power source and battery charging device having means for removably connecting rechargeable batteries. A regenerative fuel cell electrically is coupled to the power source and electrical circuit.

The regenerative fuel cell system includes an electrolysis cell stack having water input and a hydrogen gas output. The electrolysis cell stack is arranged to receive electrical power from the power source. The output of the electrolysis cell stack is coupled to a hydrogen storage device to store the hydrogen gas. A fuel cell having an input and an electrical output is arranged to receive hydrogen gas from the hydrogen storage device and output electrical power to the electrical circuit.

Additionally, a controller is coupled to the regenerative fuel cell. The controller has means for determining the availability of said natural renewable resource. The controller further has means for changing the state of operation of the regenerative fuel cell depending on the availability of the natural renewable resource.

A method for optimizing the use of available electrical power sources is also provided. The method includes the steps of first determining the amount of hydrogen gas held in storage. The amount of available electrical energy available from a regenerative fuel cell is then determined. The amount of available electrical energy is compared to a plurality of discrete load circuits coupled to the regenerative fuel cell. Finally, one or more of said plurality of discrete load circuits is selectively disconnected based on a predetermined prioritization of the discrete load circuits and an expected level of electrical usage whereby the selection process maximizes the utilization of the electrical energy while maintaining mission critical load circuits.

The above discussed and other features will be appreciated and understood by those skilled in the art from the following detailed description and drawings.

BRIEF DESCRIPTION OF THE DRAWINGS

Referring now to the drawings, which are meant to be exemplary and not limiting, and wherein like elements are numbered alike.

DESCRIPTION OF PREFERRED EMBODIMENT

Traditionally, electrical power distribution systems that were deployed in field operation camps were connected to generators powered internal combustion engines. The generators or "gensets" provided all the electrical power needs for the operation camp in that location. However, gensets created several problems, especially when utilized in military field operations where a certain degree of stealth was required. First, gensets are typically fueled by hydrocarbon based fuel, such a diesel, natural gas or JP-8. This need for fuel created logistical issues, and the operations needed to be positioned such that the logistical fuels could be delivered on a regular basis. A second problem created by the gensets is that since they burned fuel to generate the mechanical energy to rotate the generator, the genset often created heat and exhaust. While the heat could be utilized in the operations, it often also created a "signature" that could be detected by opposing forces to identify the location of the camp.

To compensate for these difficulties, military operations planners often incorporated renewable power sources such as photovoltaic arrays and wind turbines into the design of the operation camps to provide the necessary electrical needs for the operation. Some of these renewable power systems, such as that described in PCT application WO2004/063567A2 entitled "Mobile Power System" assigned to Skybuilt Power, LLC which is incorporated herein by reference, were designed into containers to allow easy transport. However, as is usually the case with renewable power systems, the natural resource that provides the energy (e.g. solar, wind, tidal) is not always available. Therefore, the mobile power systems incorporated banks of batteries to store electrical energy for use when the natural resource was not available (e.g. night time).

However, while batteries have their place and are suitable for their intended purposes, they have several drawbacks in that they are usually very heavy, and require diligent maintenance. The weight characteristic can be problematic since these units often have to be deployed using aircraft. Thus, the amount of battery storage is usually limited. Additionally, recent advancement in personal electronic equipment utilized by field personnel in carrying out their assignments has created a need for lightweight, transportable systems for recharging the batteries used in the equipment carried by operations personnel. This electronic equipment includes not only traditional accessories, such as radios and flashlights, but advanced battlefield network and communications hardware, helmet mounted displays, night vision technology, GPS devices, digital compasses, computers and cameras.

Figure 1:
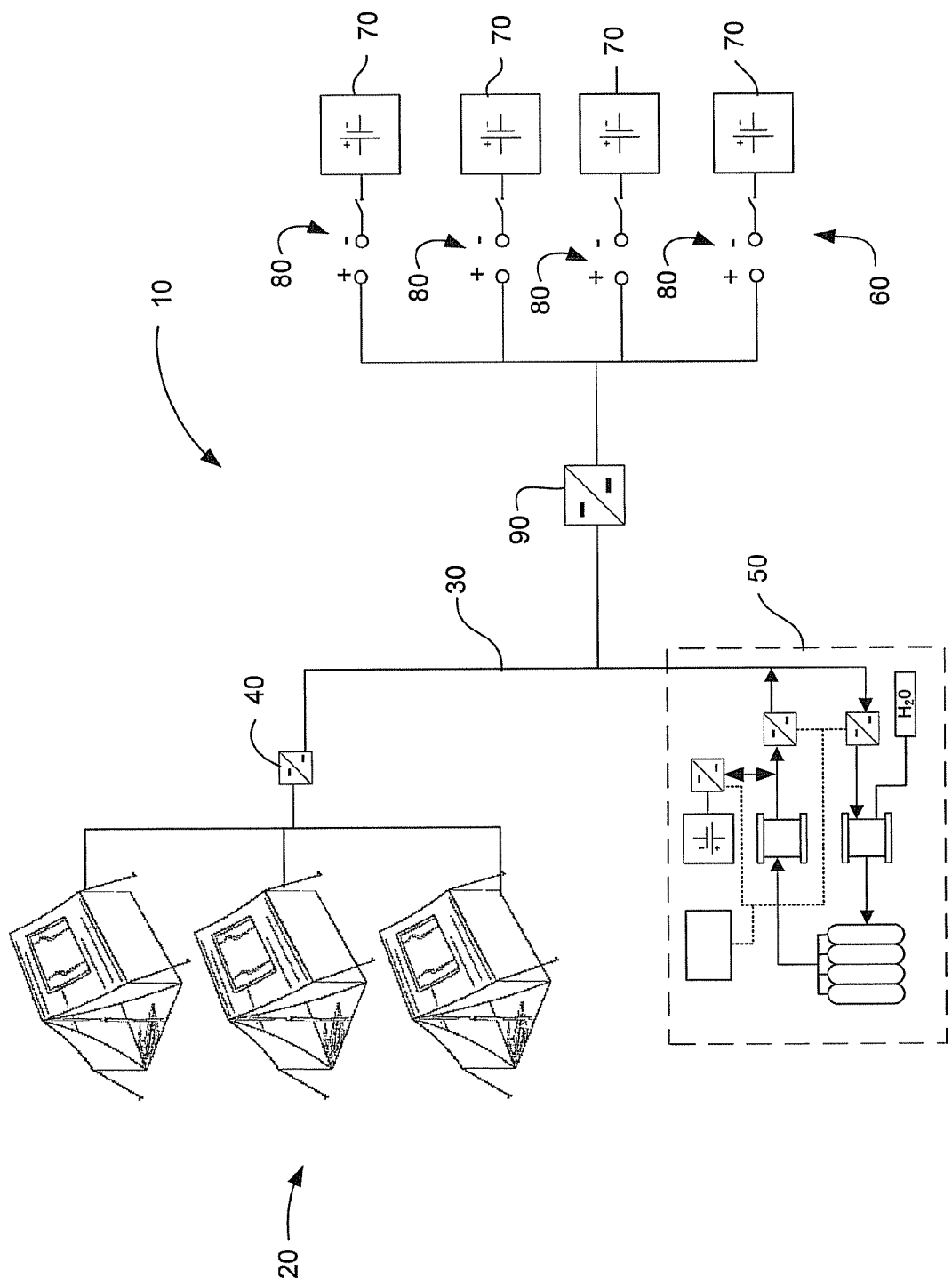
FIG. 1 is a schematic illustration of the preferred embodiment power distribution system for charging batteries.

Referring now to FIG. 1, a power distribution system 10 in accordance with the present invention will not be described. The system 10 includes at least one, and preferably a plurality of photovoltaic arrays 20 ("PV arrays"). In the preferred embodiment, the PV arrays 20 are incorporated in to a tent or shelter utilized by the field operations personnel. These tent PV arrays 20 may be similar to that described in U.S. Pat. No. 6,491,051B2 entitled "Solar Survival Shelter" which is hereby incorporated by reference, where the PV array 20 is incorporated into the roof of the shelter. This allows the power source to be easily and quickly deployed to the field of operations where it is needed.

The PV arrays 20 are connect to the power distribution line 30 through a power converter 40 which transforms the raw electrical power generated by the PV array 20 into a usable, and constant form. The power converter 40 transforms the power provided by the PV array 20 to match the electrical characteristics of the load it is supplying. In the exemplary embodiment the power converter 40 is similar to that described in U.S. Pat. No. 6,693,409 entitled "Control system for a power converter and method of controlling operation of a power converter" which is incorporated herein by reference. The power converter 40 may be of any type that can manage electrical characteristics such as, but not limited to, AC frequency, phase or voltage on either side of the converter and control the power flow at the same time. Preferably, the power converter 40 will automatically and independently adjust the electrical characteristics of the electrical power produced by PV array 20 to be compatible with the connected load and utility network. In addition the power converter 40 will preferably be able control the reactive power on each side independently making possible some amount of voltage control on either side of the converter. This arrangement provides a number of advantages over the prior art systems in that this embodiment allows the widest variety of electrical power sources to be used when they are available. For example, if a genset is available, the generator will be able to operate in variable speed generator ("VSG") mode to achieve improved performance and efficiency at partial loads.

Also coupled to the power distribution line 30 is a regenerative fuel cell system ("RFC") 50. As will be described in more detail below, the RFC utilizes excess electrical power generated by the PV arrays 20 to create hydrogen gas. The hydrogen gas may then be stored and during periods such as night time, the RFC can use the stored hydrogen gas to generate electrical power.

The power distribution line 30 couples to a second power converter 90. The power converter 90 is of the same type of technology as that described above in reference to power converter 40. Power converter 90 couples the power distribution line 30 to the end load 60. In the preferred embodiment, the load 60 consists of a plurality of battery chargers 80 that are configured to receive removable battery packs 70 that are used by field personnel during operations.

RFC's provide a reversible electrochemical process for using electricity to convert water into hydrogen and oxygen and then reversing the process to combine the hydrogen and oxygen to create electricity. Typically, these systems have a membrane electrode assembly ("MEA") which includes an ion conducting polymer membrane sandwiched between two electrodes containing a catalyst material. In fuel generation, or electrolysis mode, the electrical current is passed through the electrodes, causing the water in contact with the anode catalyst to decompose into its base elements of hydrogen and oxygen. Due to the unique characteristics of the polymer membrane, hydrogen ions are driven by the electrical current to the opposite cathode electrode where in the presence of the second catalyst, the hydrogen ions recombine with electrons to form hydrogen gas. In electrical generation, or fuel cell mode, the process is reversed. Hydrogen gas is introduced to the cathode electrode which decomposes the hydrogen into a hydrogen ion and an electron. The hydrogen ion passes through the MEA and combines with oxygen to form water at the anode electrode. Regenerative fuel cell systems are commonly divided into two categories: unitized regenerative fuel cells and discrete regenerative fuel cells.

In a unitized regenerative fuel cell system ("URFC"), a single electrochemical cell used to generate both the hydrogen gas and the electricity using the same MEA. This type of system has several advantages in that a single component can be used for both generating modes, leading a smaller lighter system. However, since the process must be completely reversible within the component, neither of the electrodes can be optimized for a particular generation mode resulting in efficiency losses. Due to efficiency issues and cost considerations, URFC's are typically limited to aerospace or geographically remote applications where the size and weight parameters are paramount.

In contrast to the URFC, a discrete regenerative fuel cell ("DRFC") system is designed to utilize two electrochemical cell components: an electrolysis cell for generating hydrogen; and a fuel cell for generating electricity. By dividing the generation modes between two components each of the individual cell components can be optimized for its particular purpose. This leads to a more efficient and cost effective solution than can be currently accomplished with a URFC.

Figure 2:
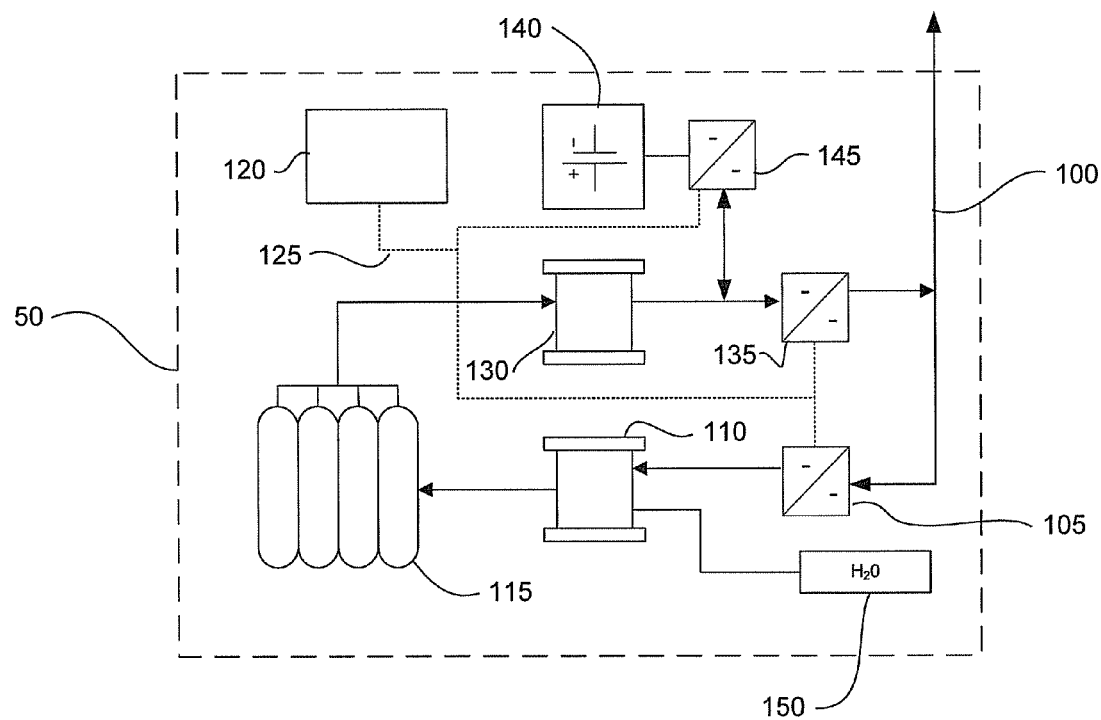
FIG. 2 is a schematic illustration of the regenerative fuel cell system of FIG. 1.

The exemplary embodiment of the RFC contemplated for the present invention is shown in FIG. 2. The RFC described herein is similar to U.S. patent application Ser. No. 10/708,165 entitled "Regenerative Fuel Cell System and Method Thereof" assigned to the same assignee as the present invention and which is incorporated herein by reference. Here, during periods when the natural resources such as daylight are available to allow the PV array 20 to generate electrical power, excess power that is not being used by the load 60 is conducted via line 100 to the RFC. The electricity is carried transmitted from line 100 through power converter 105 which conditions the electricity to have the appropriate characteristics for the electrochemical electrolysis stack 110. The electrolysis stack 110 combines the electricity and water from storage container 150 to produce hydrogen and oxygen gas. Typically, the oxygen gas is vented to the atmosphere while the hydrogen gas is captured and stored in containers 115. In the preferred embodiment, the containers 115 are metal cylinders capable of storing hydrogen gas under pressures between 14.7 psia and 10,000 psig. Containers 115 may also utilize an alternate technology such as but not limited to metal hydrides or sodium borohydrides.

A controller 120 provides the necessary logic and algorithms to control the power converter 105 and any additional control hardware such as valves (not shown) that are necessary for operation of the RFC 50. When the controller 120 detects a change in the electrical power availability from the PV arrays 20, controller 120 releases hydrogen gas from the containers 115 and initiates operation of the fuel cell 130. Since there is usually a latency period while the fuel cell 130 initiates, an optional energy bridge device 140, such as an ultracapacitor is coupled in parallel with the fuel cell 130. The energy bridge 140 may be any type of energy storage device such as, but not limited to, fly wheels, batteries, capacitors, super-capacitors and ultracapacitors. Depending on the type of energy bridge and the characteristics of the power it provides, an optional power conversion device 145, or rectifier (not shown) may also be used. The energy bridge device 140 is sized to provide sufficient electrical power for a sufficient time period as to allow the fuel cell 130 to attain an operational state. Electrical power from the fuel cell 130 and/or energy bridge device 130 is transformed by another power converter 135 that transforms the electrical power into the electrical characteristics required by the power distribution line 30.

Figure 3:
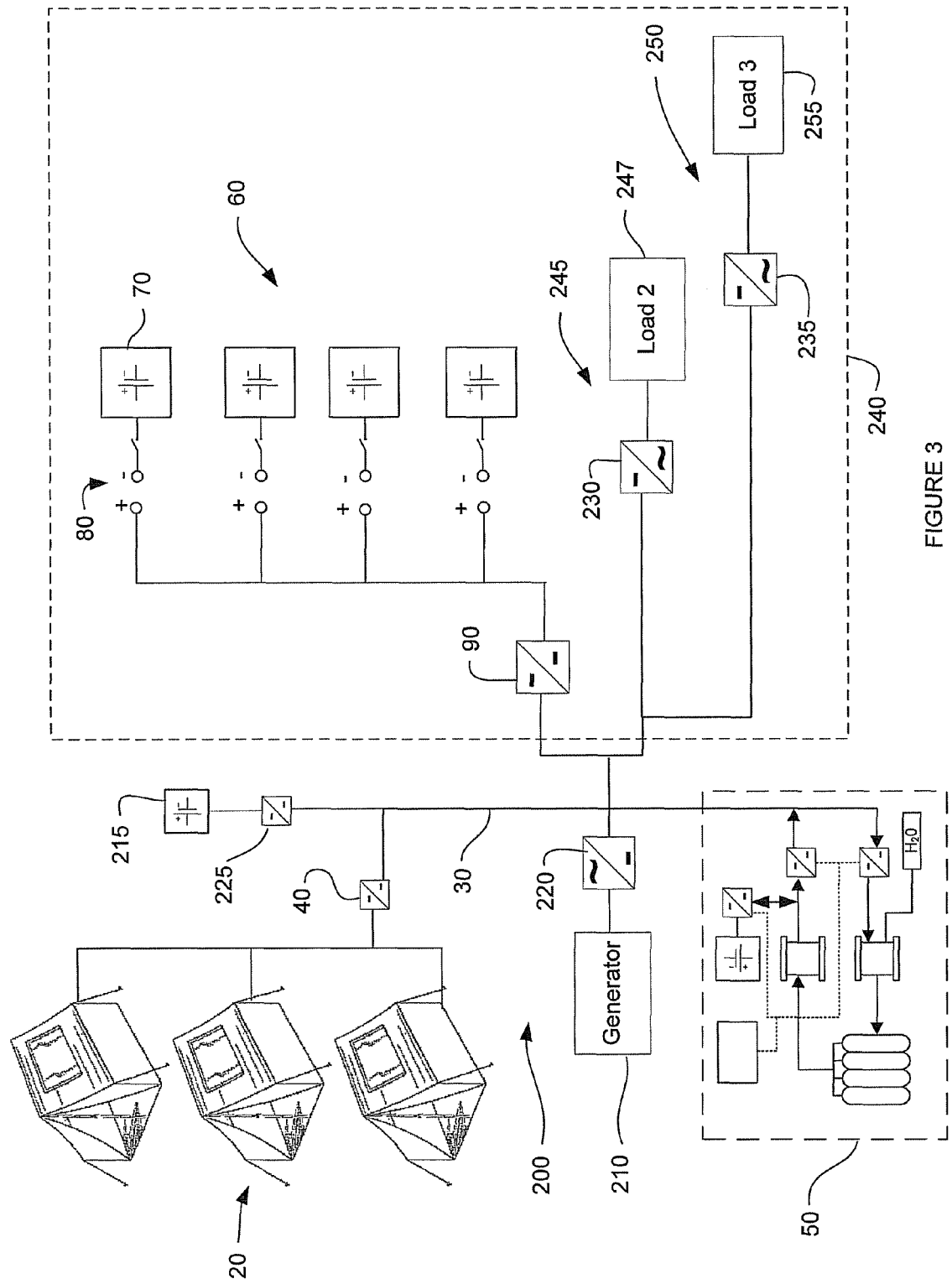
FIG. 3 is a schematic illustration of an alternate embodiment power distribution system including multiple power sources and multiple loads; and, FIG. 4 is a schematic illustration of an alternate embodiment of the power distribution system shown in FIG. 3 including a means for selectively shedding loads depending on power availability.

It should be appreciated that the embodiment illustrated in FIG. 1 is more appropriate for remote field operations camps or deployment where mobility, camouflage, and stealth are prime considerations and electrical power requirements are more modest. However, the advantages gained through the coupling of the RFC to provide bridge power coverage during periods when either the natural resources are unavailable, or when it is undesirable to operate gensets for tactical reasons (e.g lower thermal or audible signatures). Referring now to FIG. 3, the power distribution system 10 will be described when more than one power source is available for utilization by the field camp.

A power distribution system 200 incorporates a variety of different and asynchronous power sources into a single system for use by the field operations camp. The power sources include but are not limited to PV arrays 20, RFC 50, generator 210 and energy storage device 215. Generator 210 may be any power generator capable of generating AC electrical power, including but not limited to electrical generators powered by hydrocarbon fueled (i.e. diesel, gasoline, propane or natural gas) internal combustion engines, hydrogen internal combustion engines, external combustion engines, Stirling engines, microturbines, steam turbines, gas turbines, flywheels, wind turbines, photovoltaic arrays, batteries, capacitors, super-capacitors and ultracapacitors, wind turbines, current turbines, tidal power generators, flywheels. The generator 210 is coupled to the power distribution line 30 by a power converter 220 which rectifies the generated electrical power and transforms the electrical power to have characteristics appropriate and compatible with power distribution line 30. In the preferred embodiment, the power converter 220 is the same type as that in U.S. Pat. No. 6,693,409 incorporated above. The energy storage device 215 may be any type of device capable of storing electrical energy including but not limited to, flywheels, batteries, capacitors, super-capacitors and ultracapacitors. The energy storage device 215 may also optionally provide power quality control.

The power distribution line 30 enters the load portion 240 of the operations camp where it is branched into multiple circuits 60, 245, 250. Each of the circuits 60, 245, 250 support a different load having different electrical characteristics. As used herein, "circuit" means a group of electrically connected loads sharing a common set of compatible electrical characteristics. It should be appreciated that within a circuit, various commonly known electrical distribution equipment may be incorporated such as, but not limited to, load panels, circuit breakers, switches, contactors and the like may be used to further control and manage the flow of electrical power.

Circuit 60 is the same as that described above with reference to FIG. 1. The load in circuit 60 is primarily battery chargers that charge removable batteries. Circuit 60 receives DC electrical power from power converter 90 which is coupled to power distribution line 30.

Power converter 230 receives electrical power from power distribution line and inverts the electricity to create alternating current (AC) electrical power having the characteristics required by circuit 245. Circuit 245 includes loads 247 that share common electrical characteristics, for example, 120V, 60 Hz, single phase. Circuit 245 may support loads 247 such as, but not limited to, lighting, radios, heating units, refrigerators, computers, communications equipment and the like. The power converter 230 may be of any type that can manage AC frequency, phase or voltage on either side of the converter and control the power flow at the same time. In addition the power converter 230 can control the reactive power on each side independently making possible some amount of voltage control on either side of the converter. In this embodiment, the power converter 230 is the same type of power converter as described in U.S. Pat. No. 6,693,409 incorporated above.

Power converter 235 receives electrical power from power distribution line 230 and similar to power converter 230, inverts the DC electrical power to form AC power. Circuit 250 includes one or more loads 255 which share common electrical characteristics. While circuit 250 may share the same electrical parameters as circuit 245, it is contemplated that it may also have different characteristics, for example, 480V, 60 Hz, three phase. Circuit 250 may support similar loads to those described above and may further support loads such as air conditioning equipment, machinery (e.g. milling machines and lathes), heating equipment and the like. The power converter 235 may be of any type that can manage AC frequency, phase or voltage on either side of the converter and control the power flow at the same time. In addition the power converter 235 can control the reactive power on each side independently making possible some amount of voltage control on either side of the converter. In this embodiment, the power converter 235 is the same type of power converter as described in U.S. Pat. No. 6,693,409 incorporated above.

Figure 4:
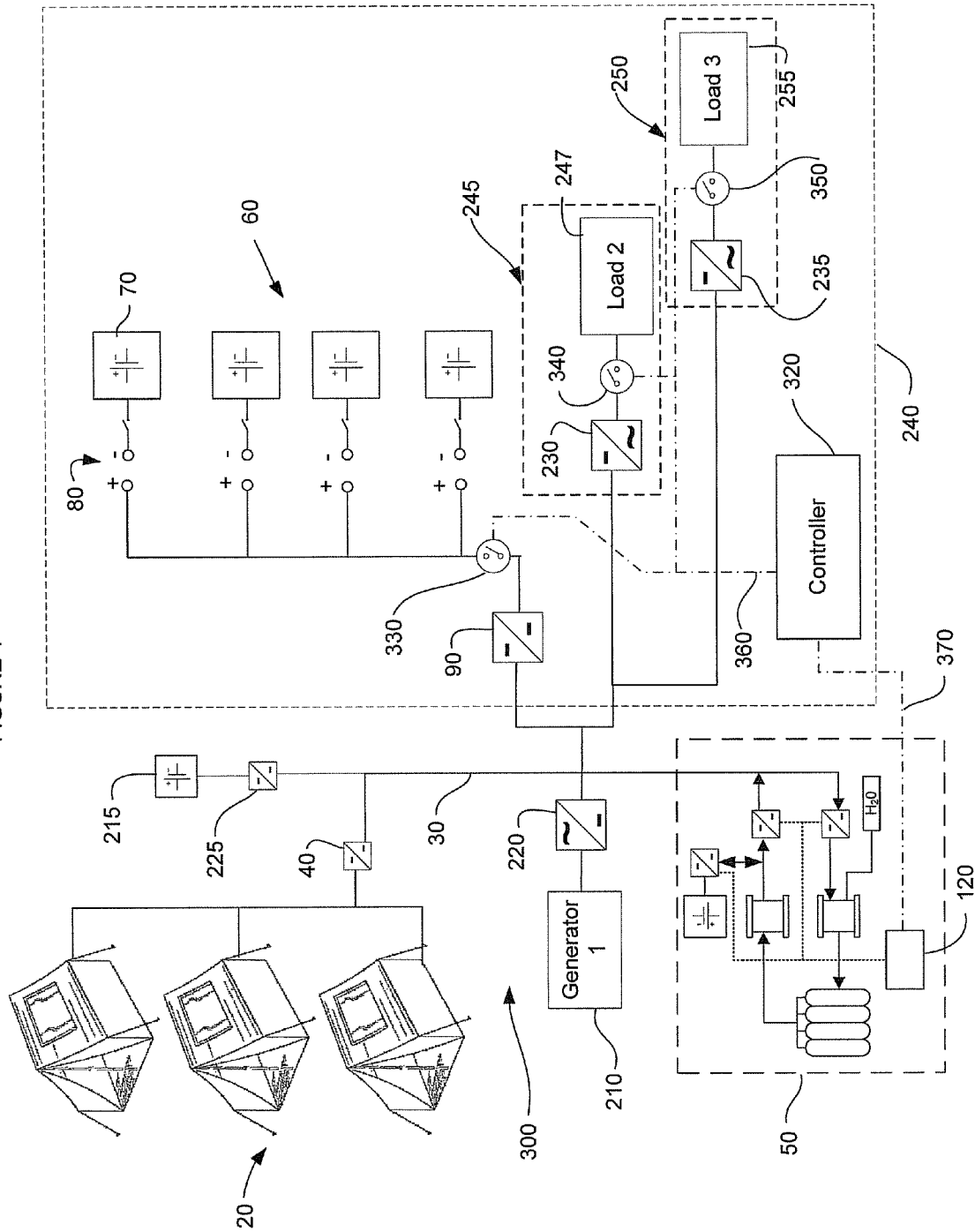

Another alternate embodiment is illustrated in FIG. 4. This embodiment is similar to that shown in FIG. 3. In this embodiment, disconnect switches 330, 340, 350 are coupled to circuits 60, 245, 250 respectively. Each of these disconnect switches 330, 340, 350 is arranged downstream from the power converters 90, 230, 235 to allow the interruption of electrical power to each of their respective circuits. The switches may be of any suitable type of switch, such as a remote operated circuit breaker or a SCR switch, that allows the switch to be coupled to a central controller 320 via a communication line 360. Alternatively, communications between the controller 320 and the switches may occur over the electrical power lines, eliminating the need for a separate communication line 360. As will be described in more detail below, the controller 320 is configured to selectively shed, or disconnect, load circuits depending on the circuit's priority or mission critical status. Alternatively, if the individual loads are capable, the controller 320 may communicate with the individual loads and instruct them to de-rate their operation to reduce electrical power consumption. For example, a lighting circuit may be instructed to dim thus reducing its power requirements.

The RFC 50 includes a controller 120 that monitors the operation and status of the various components within the RFC 50. The data collected by the controller 120 includes information related to the power capacity and the amount of hydrogen gas stored. Since the relationship between hydrogen usage and generated power is a known relationship, the controller 120 can determine how much electrical power the RFC can provide. For example, in an average system 300, the RFC 50 will have a maximum capacity of between 10 kW/hrs and 100 kW/hrs of electrical power available. Controller 120 is coupled to central controller 320 via communications line 370 and data regarding the status and availability of the RFC 50 to central controller 320.

From the information central controller 320 receives from controller 120, it can be determined if there is sufficient capacity to meet the needs of all the circuits 60, 245, 250. In the event that central controller 320 determines that there is insufficient capacity, the controller 320 may selectively remove circuits by opening the disconnect switches 330, 340, 350. The decision to disconnect a circuit will be based on the priority level of the circuit. In the exemplary embodiment, the circuits are sequentially prioritized from 1 to 3 with the circuit 60 (battery chargers) having the lowest priority of 1, circuit 245 having a priority of 2 (lighting) and circuit 250 having the highest priority of 3 (medical equipment). It is anticipated that the priority level may change on a periodic basis depending on anticipated mission requirements. For example, if extended field operations are anticipated, the battery charging circuit may have an increased priority to ensure that the field personnel will have sufficient equipment power to complete their mission.

Controller 320 makes a determination to remove electrical loads based on a number of factors, including the power producing capacity of RFC 50, the availability of any generators 210, electrical load demands of the circuits 60, 245, 250 and the circuit priority levels. The determination of which loads will be disconnected may be predetermined by the operators, or may be determined dynamically by the controller based on anticipated future electrical demands. Factors that would determine anticipated future demand would include, but is not limited to, the hydrogen storage capacity, volume of hydrogen stored, predicted weather forecast, time of day, the nature of the mission, and past operating history. By selectively removing circuits from the system 300, the central controller can ensure that the remote field operations are operating at an optimized state to increase the chances of the completion of an assigned mission. In general, the system will be arranged to maintain power to "mission critical" electrical circuits for as long as possible. As used herein, mission critical means those circuits necessary for completion of an assigned mission.

It should be appreciated that the controller 320 may also operate in a reverse fashion to ensure that an adequate hydrogen supply is available to provide sufficient electrical power when the renewable power sources are unavailable. In this mode of operation, the controller 320 monitors the amount of hydrogen stored and determines the amount of expected electrical energy that will be available from the renewable natural resources. If the controller 320 determines that there is insufficient renewable resources available to allow storage of the necessary hydrogen, the controller 320 may selectively disconnect the circuits based on their priority to make more electrical power available to the regenerative fuel cell.

Additionally, the exemplary embodiments that are described herein reference only a single renewable energy power source and a single RFC. However, this is for exemplary purposes only and the present invention will work with any combination of multiple renewable energy power sources and multiple RFC's.

While the invention has been described with reference to a preferred embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A method for optimizing the use of available electrical power sources, said method comprising the steps of:
   determining the amount of hydrogen gas held in storage;
   determining the amount of available electrical energy available from a regenerative fuel cell;
   comparing said amount of available electrical energy to a plurality of electrical circuits coupled to said regenerative fuel cell; and
   selectively disconnecting one or more of said plurality of electrical circuits based on a predetermined prioritization.

2. The method for optimizing the use of available electrical power sources of claim 1 further comprising the steps of:
   determining the amount of electrical power being generated from a natural renewable resource;
   determining the amount of electrical power demand from an electrical circuit; and,
   selectively operating said regenerative fuel cell if said electrical power demand is greater than said electrical power being generated.

3. The method for optimizing the use of available electrical power sources of claim 2 further comprising the step of identifying some of said electrical circuits as mission critical electrical circuits.

4. The method for optimizing the use of available electrical power sources of claim 3 wherein said step of selectively disconnecting electrical circuits is performed whereby the utilization of said electrical energy is maximized while maintaining mission critical electrical circuits.

5. The method for optimizing the use of available electrical power sources of claim 4 further comprising the steps of determining an expected level of future electrical demand.

6. The method for optimizing the use of available electrical power sources of claim 5 wherein said step of selectively disconnecting electrical circuits is determined based on the expected level of future electrical demand.

7. The method for optimizing the use of available electrical power sources of claim 6 further comprising the step of transmitting an instruction to a load to reduce the consumption of electrical power.

8. The method for optimizing the use of available electrical power sources of claim 7 further comprising the step of:
   determining if the amount of available electrical energy available from a natural renewable resource increases; and,
   connecting one or more of said plurality of electrical circuits based on a predetermined prioritization and the availability of said increased natural renewable resource.

9. The method for optimizing the use of available electrical power sources of claim 8 wherein said predetermined prioritization provides for connecting mission critical electrical circuits before non-mission critical electrical circuits.

10. The method for optimizing the use of available electrical power sources of claim 9 further comprising the step of determining if the availability of said increased natural renewable resource is greater than the electrical demands from said plurality of electrical circuits.

11. The method for optimizing the use of available electrical power sources of claim 10 further comprising the step of operating the regenerative fuel cell if the electrical power available from the natural renewable resource is greater than the electrical demand from the plurality of electrical circuits.

12. A method for optimizing the use of available electrical power sources, said method comprising the steps of:
    determining the amount of hydrogen gas held in storage;
    determining the amount of available electrical energy available from an electrical generator utilizing said stored hydrogen gas;
    comparing said amount of available electrical energy to a plurality of electrical circuits coupled to said regenerative libel cell; and
    selectively disconnecting one or more of said plurality of electrical circuits based on a predetermined prioritization.

13. The method for optimizing the use of available electrical power sources of claim 12 further comprising the steps of:
    determining the amount of electrical power being generated from a natural renewable resource;
    determining the amount of electrical power demand from an electrical circuit; and,
    selectively operating said electrical generator if said electrical power demand is greater than said electrical power being generated by said natural renewable resource.

14. The method for optimizing the use of available electrical power sources of claim 13 further comprising the step of identifying some of said electrical circuits as mission critical electrical circuits.

15. The method for optimizing the use of available electrical power sources of claim 14 wherein said step of selectively disconnecting electrical circuits is performed whereby the utilization of said electrical energy is maximized while maintaining mission critical electrical circuits.

16. The method for optimizing the use of available electrical power sources of claim 15 further comprising the steps of determining an expected level of future electrical demand.

17. The method for optimizing the use of available electrical power sources of claim 16 wherein said step of selectively disconnecting electrical circuits is determined based on the expected level of future electrical demand.

18. The method for optimizing the use of available electrical power sources of claim 17 further comprising the step of transmitting an instruction to a load to reduce the consumption of electrical power.

19. The method for optimizing the use of available electrical power sources of claim 18 wherein said electrical generator is a hydrogen internal combustion engine.

20. The method for optimizing the use of available electrical sources of claim 18 wherein said electrical generator is a regenerative fuel cell.

* * * * *